United States Patent [19]

Freeman et al.

[11] Patent Number: 5,112,402
[45] Date of Patent: May 12, 1992

[54] PIGMENT SYSTEM FOR PAINTS

[75] Inventors: Gary M. Freeman; Thad T. Broome, both of Macon, Ga.

[73] Assignee: J. M. Huber Corporation, Rumson, N.J.

[21] Appl. No.: 753,545

[22] Filed: Sep. 3, 1991

Related U.S. Application Data

[63] Continuation of Ser. No. 518,715, May 4, 1990, abandoned.

[51] Int. Cl.$^5$ ............................................. C04B 33/04
[52] U.S. Cl. ................................... 106/416; 501/147; 162/181.8
[58] Field of Search ..................... 162/181.8; 106/416; 501/147

[56] References Cited

U.S. PATENT DOCUMENTS

| | | | |
|---|---|---|---|
| 4,309,222 | 1/1982 | Hoyt, IV | 106/288 B |
| 4,812,299 | 3/1989 | Wason | 423/328 |
| 4,880,759 | 11/1989 | Kohut | 501/148 |
| 4,916,094 | 4/1990 | Salinas | 501/146 |

*Primary Examiner*—William R. Dixon, Jr.
*Assistant Examiner*—Chris Gallo
*Attorney, Agent, or Firm*—Harold H. Flanders; Alec H. Horn; Robert L. Price

[57] ABSTRACT

The present invention relates to slurries of synthetic alkali metal silicates with fine particles kaolin clay. The slurries consists of at least 50% solids which solids comprise an approximately 50:50 combination of the fine kaolin clay and the synthetic alkali metal silicate (SAMS). The integrated composition of the SAMS products is an entity having an overall composition of $$xM_2O:Al_2O_3:ySiO_2O$$

where x is the number of moles of alkali metal oxide and is an integer from 0.01 to 2.0, M is an alkali metal, y is the number of miles of SiO$_2$ in the unique SAMS composition, and z is the number of moles of bound water and is an integer ranging from 1.0 to 5.0. The composition essentially comprises altered kaolin clay platelets with an integral rim or protuberance of essentially amorphous alkali metal silicate-kaolin reaction product. The slurry is useful in latex paint systems.

8 Claims, No Drawings

PIGMENT SYSTEM FOR PAINTS

This application is a continuation of application Ser. No. 07/518,715, filed May 4, 1990, now abandoned.

RELATED AND PRIOR KNOWN ART

At this time, most titanium dioxide extenders available to the paint and coatings industries are available in dry form only. Flash calcined clays (Optiwhite and Optiwhite P, Burgess Pigments), standard calcined clays (Huber 70C and equivalents), and amorphous silicates (Zeolex 80 and equivalents) are available in dry bulk form or in bags. High brightness, fine particle size calcined clay (Satintone 5 by Engelhard, or equivalent) is available in either dry or slurry form, but is not widely used in flat paints, the dominant grade in trade sales paints, due to its fine particle size which results in higher gloss and sheen values. Even Samhide 583 from the Clay Division is available only in bag form. Many paint manufacturing plants have already installed slurry systems for their major pigments, and such plants are having to deal with this situation in one of two ways. They must either formulate around extender pigments since they are not available in slurry form, or they must purchase dry product and make the slurry at their plant. If the paint plant chooses not to use extender pigments, chemical costs can be quite high since titanium dioxide must be used unextended. There are two alternatives for making slurries at the paint plant. A plant may choose to use large quantities of standard extenders such as Huber 70C and therefore require a large makedown system and the associated storage facilities. Alternatively, the plant may choose to use a smaller quantity of a high performance pigment such as flash calcined clay, and empty bags of the material directly into batch tanks for dispersion. In either case, the paint manufacturer is paying the labor costs of slurry makedown He may also be paying for a larger inventory than desireable, either in bulk form or in bag, so that the most favorable freight rate can be obtained. The formation and subsequent stabilization of structured clay pigment slurries from dry calcined clay feedstocks is well known, related technology. For example, U.S. Pat. No. 4,374,203 (February, 1983) describes the preparation of a stable calcined clay slurry of 50% solids by using a stabilizing combination of anionic and cationic polymers. Specifically, the slurry was stabilized by incorporating approximately 0.30-0.49% Acrysol ASE-60 (a crosslinked acrylic co-polymer emulsion) and approximately 0.007-0.011% Ionac PE-100 (a quaternary aliphatic polyamine) followed by adjusting the pH to 8. The Acrysol TT-615 thickener used in our process is an alkali soluble acrylic polymer emulsion (it is therefore a close relative to ASE-60). However, our Polywhite 8004, being naturally alkaline, can be effectively stabilized using an acrylic polymer thickener alone (thereby negating the need for any auxiliary cationic or for any subsequent pH adjustment).

In U.S. Pat. No. 3,846,147 (November, 1974), a stable aqueous slurry of calcined clay is described wherein a combination of hydroxyethyl cellulose and sufficient alkalizing agent to provide pH greater than 8 are employed as the stabilizing agents. Likewise, U.S. Pat. No. 4,017,324 describes slurries of 50+% solids comprised of a mixture of calcined clay (2.0-5.25 parts) and hydrous clay (1.0 part). The suspension characteristics of the calcined clay were improved by the addition of hydrous clay; but, an auxiliary suspending aid such as bentonite clay or CMC was still employed at levels ranging from 0.01%-10%.

DESCRIPTION OF THE INVENTIVE PROCESS

Samhide 583 functions quite well as a titanium dioxide extender, but is available in dry bags only. Work was done to make a slurry of Samhide 583, but under moderate-shear makedown conditions the highest solids possible with acceptable rheology for loading and off-loading tank trucks and rail cars was about 35%. This level of solids would be highly unfavorable for freight rates, and would also be too low for incorporation into paint formulations. It had been learned in research directed toward the paper industry that Samtone 581 (the paper industry analog of Samhide 583) could be made down at higher solids when blended with hydrous clays. This work showed that as the dilatancy of the clay decreased, higher solids levels could be obtained for the pigment system. Furthermore, as more clay was used, higher solids could be attained. The same principles were used to prepare mixtures of Samhide and clay, with the highest solids being attained when Huber HG-90 clay was used.

Although the greatest success was seen in slurries when Huber HG-90 was used, this also raised a potential problem. The titanium dioxide extender pigments mentioned above also provide flatting characteristics to a paint. Huber HG-90, being a fine particle size clay, generally would not be used in a flat paint since the morphology of the clay would yield higher glossing characteristics. However, when a combination of the two pigments was made at a level of 55% Huber HG-90 and 45% Samhide 583, performance in paint exceeded that of standard calcined clay, and rivaled that of the flash calcined clay not only in optical properties, but in flatting characteristics as well.

To deliver such a product to a paint plant, one must either dry the material and supply a dry product, or prepare a stable slurry. The preparation of the dry material requires no special technology, but the preparation of a stable slurry required innovation. The blended products at approximately 54% solids reached a high shear viscosity such that higher solids were impractical. However, the low shear was less than 200 cps which allowed settling. Additionally, simply adding the two dry components to a high shear mixer containing the water for the desired solids level was impossible due to high viscosity and degraded product performance properties. A scheme was devised in which a particular addition sequence (of portions of the waster and portions of one or more dry components) was devised so the proper high shear viscosity could be attained at the proper solids. A viscosity modifier is then added which raised low shear viscosity without negatively affecting the high shear viscosity.

It has since been discovered that other SAMS products can be incorporated into similar combinations with equal success. In these cases, some properties of the finished paint film are changed from those using the original slurry, but the properties reflect the nature of the new structuring pigment. Further laboratory work has shown that compositional ratios different than those of this single product are possible. Such blends may be advantageous in specific applications.

The invention describes a unique process wherein a structured clay pigment slurry consisting of a combination of SAMS pigment and hydrous clay is produced at 50+% solids which is particularly useful in latex paint systems The SAMS pigment used in this process was SAMHIDE 583 (per U.S. Pat. No. 4,812,299) and for simplicity will be hereafter generically referred to as H-SAMS.

U.S. Pat. No. 4,812,299 describes synthetic alkali metal alumino silicates, prepared by reacting kaolin clay with alkali metal silicates in specific molar ratios and reactants under specific reaction conditions. The patent contains considerable data concerning reactants and reaction conditions, and present large amounts of technical data directed to a description of the products. Generally speaking, the product can be defined as an alkali alumino-silicate having a composition in terms of mole ratio of oxides as follows:

$$xM_2O:Al_2O_3:ySiO_2:zH_2O$$

wherein x is the number of moles of alkali metal oxide and is an integer of 0.01 to 2.0, M is an alkali metal, y is the number of moles of $SiO_2$ associated with the compositions and is an integer of 2.0 to 10.0 and z is the number of moles of bound water and is an integer if 1.0 to 5.0, wherein primary particles of said alkali metal aluminosilicate comprise a core of clay platelets having an integral adjacent area of essentially amorphous alkali metal silicate base-kaolin clay reaction product.

The product (synthetic alkali metal alumino-silicate or SAMS) can be also defined as an alkali metal alumino-silicate comprising a core of kaolin clay platelets which have been altered at their edges by reaction, so as to be integral with one or more adjacent areas of essentially amorphous alkali metal silicate-base kaolin clay reaction product having a composition in terms of mole ratio of oxides as follows:

$$xM_2O:Al_2O_3:ySiO_2:zH_2O$$

where M is sodium or potassium, x is the number of moles of sodium oxide or potassium oxide and is an integer of 0.01 to 2.0, y is the number of moles of $SiO_2$ in the SAMS composition and is an integer greater than 2.0, and z is the number of moles of bound water and is an integer of 1.0 to 5.0; wherein the primary particles of said alkali metal alumino-silicate have attenuated kaolin peaks as compared to kaolin in x-ray diffraction patterns form the kaolin remnants in the compositions. The alkali metal silicate is generally a sodium silicate, but potassium or lithium silicate can be used. The product can contain at least traces of zeolite materials. The materials generally have an oil absorption value having a range of about 40 to 220 ml/100 g, and a surface area of about 2 to 300 m²/g. The more preferred SAMS products have an oil absorption range of about 80 to 160 m./100 g and a surface area range of 10 to 30 m³g.

The SAMS disclosed in the patent may be used as effective pigment (titanium dioxide) extenders in paint and paper applications, as functional fillers or reinforcing agents in plastics and elastomers, as a catalyst support and carrier in catalyst preparation, as a thixotrope, as a conditioning and free flow agent, and in defoamer compositions. Because of their low abrasion characteristics, the materials may be used to fill Xerox and electrostatic copier papers. They can also be used in a variety of specialty applications and as an opacifier, a diazo paper filler, a flatting agent, in silicone rubbers and other applications.

The entire teachings of the patent are incorporated by reference herein.

The hydrous clay of choice was Hydragloss 90. The dry weight ratio of H-SAMS to Hydragloss 90 utilized in our process was 45/55 at a total solids content of approximately 54.0%.

Although composite slurries having other H-SAMS/Hydragloss 90 ratios can be produced, the targeted paint performance properties in terms of opacity, tint strength, flatting and scrub dictated that a 45/55 ratio be employed. Our H-SAMS/Hydragloss 90 slurry was designed to allow effective replacement of delaminated clay slurry plus dry calcined clay in latex paint formulas. Delaminated clay and calcined clay are commonly used together in latex paints but added separately.

From SAMS studies preceding the development work on Polywhite 8004, it was well recognized that the formation of H-SAMS slurries of 50+% solids was not possible unless: 1) the pore structure of the H-SAMS was largely destroyed through shear and/or 2) the H-SAMS was slurried in combination with hydrous clays having better high shear rheology characteristics. Because of the high dilatancy inherent to H-SAMS slurries, low dyne clays (like Hydragloss 90) are particularly advantageous to use as a rheology modifier. Reducing slurry dilatancy through the addition of Hydragloss 90 enables higher percent solids to be attained and improves slurry pumpability.

It was determined that at least 20% by weight of Hydragloss 90 was required to yield a composite slurry of 50% total solids under typical production makedown conditions (i.e., via high shear Cowles). Composite slurry solids greater than 50% obviously require increasing amounts of Hydragloss 90 to be used. Obtaining a structured pigment slurry of 50+% solids was of prime importance because:

1. Freight rates become cost prohibitive when shipping mineral pigment slurries of less than 50% solids.
2. Mineral pigment slurries of less than 50% solids are extremely difficult to utilize in high PVC latex formulations.
3. Effective stabilization of mineral pigment slurries of low percent solids is often difficult to achieve even with the employment of auxiliary suspending aids.

An additional point of interest concerning H-SAMS slurries is the relative SAMS structure reduction realized from certain makedown conditions. It was determined that structure reduction could be minimized only if H-SAMS makedowns were limited to 35% solids under moderate shear conditions (i.e., Cowles at 2000-2500 fpm). More severe structure reductions resulted when makedowns were conducted at higher solids and/or higher applied shear (See Example 1) which is detrimental to final paint properties. Using a 35% solids H-SAMS slurry made down under moderate shear as the starting point for producing a composite slurry of 50% minimum solids (per the procedure of Example 2), this then dictates that the H-SAMS/Hydragloss 90 weight ratio must be 53/47 or less.

Some addition features and parameters unique to our slurry process are summarized below: 1. Two different manufacturing procedures can be successfully practiced to yield Polywhite 8004 slurry.

Process A

A batch-type Cowles makedown of H-SAMS and then Hydragloss 90 clay in succession under moderate shear conditions to produce a 45/55 composite slurry of 54.0 total solids.

Process B

A continuous-type Cowles makedown process is used to produce the composite slurry product. This requires that a spray dried pre-blend of H-SAMS/Hydragloss 90 (at a 45/55 weight ratio) be used for building slurry solids under high shear conditions.

2. The Cowles makedowns are carried out under the minimum required shear to achieve proper wet-out and dispersion so as to avoid excessive SAMS pigment structure reduction. Excessive destruction of SAMS structure causes our product to exhibit undesirable changes in its paint performance (most notably 85° sheen values are increased).

3. The wet-out of H-SAMS or spay dried composite pigment was conducted in a Cowles makedown tank of 700 gallon capacity. Rapid pigment wet-out was best achieved using this tank unbaffled in combination with a dual impeller setup. The bottom impeller was a standard Cowles-type blade while the top impeller was a 45° pitch marine-type blade located approximately 1-1.5 feet below the slurry surface. The tank to blade diameter ratio was 3:1 in both cases. This configuration promoted the greatest vortexing of the slurry which in turn improved product wet-out rate. In particular, the use of baffles in the wet-out tank was noted to be counter productive. Following wet-out, additional mixing is required to improve product dispersion which was accomplished by either slurry recirculation or by using a second Cowles tank.

4. The Hydragloss 90 and H-SAMS (SAMHIDE 583) used in our slurry process meet their respective physical property specifications (see their attached TPPS). Organic polymeric dispersants are used in our process at levels of 0.02-0.12% (active polymer basis). The organic dispersants of choice include sodium polyacrylates (like Colloid 211) or sodium polymethacrylates (like Daxad 30).

5. To obtain composite slurry stabilization, an alkali soluble acrylic polymer (like Acrysol TT-615) is preferably employed At 54±1% solids, optimum slurry stability/pourability is achieved when the Brookfield (20 rpm) viscosity was adjusted with Acrysol TT-615 into the 1100-1600 cps range. This Brookfield viscosity adjustment typically requires Acrysol TT-615 addition at levels ranging from 0.03-0.07% (on active polymer basis). Poor slurry stability with respect to settling is obtained when Brookfield viscosities were less than 1100 cps while pourability becomes increasingly difficult when the Brookfield viscosity exceeded 1600 cps. A unique feature of our stabilization process is the direct employment of Acrysol TT-615 without pre-neutralization. The polymer is added directly to the high solids slurry, with in situ neutralization occurring as a consequence of a high existing pH (typically pH 10-11). Direct addition of the acrylic polymer requires only that good slurry agitation be employed to prevent product coagulation. This can be achieved by slowly metering the acrylic polymer emulsion directly into the slurry vortex produced in our wet-out tank or by injecting polymer into the product slurry stream via an in-line injector/mixer combination. Once formed, clumps of coagulated product are difficult to disperse.

6. A unique aspect of our continuous makedown process (Process B) concerns the initial makedown solids. The spray dried H-SAMS/Hydragloss 90 composite must be initially made down at 56% solids under high shear then reduced in solids with water to around 54.0% to yield a finished product having acceptable Hercules viscosity. A Hercules viscosity (A-Bob at 1100 rpm) better than 18+/500 rpm is needed to insure good slurry pumpability when using standard centrifugal pumps. However, it should be noted that peristaltic pumps are required for slurry pumping during the actual makedown process (because of the high interim dilatancy).

PREFERRED EMBODIMENTS

The present invention is further illustrated by the following examples, which should be regarded as demonstrating only some of the preferred embodiments and not limiting thereof.

EXAMPLE 1

In this experiment, H-SAMS and also H-SAMS/Hydragloss 90 pigment composites were made down into aqueous slurries using a 3 horsepower laboratory Cowles dissolver unit under various conditions. In each case, a 12-inch square mixing can (12.5 gallon capacity) and a 4-inch Cowles blade were employed with the mixing unit to produce 9-10 gallons of final slurry product. Makedown solids and shear conditions were, however, varied as shown in Table 1-A. Under high shear conditions, the slurry batches were subjected to a blade tip speed of 4300 fpm as compared to 2200 fpm under moderate shear conditions. In each makedown, slurry solids were built by steadily adding the dry pigment(s) over a 15-20 minute time period. In the case of tests numbers 5 and 6 (Table 1-A), the H-SAMS portion was made down first followed by the addition of Hydragloss 90 clay. The rheology and stability data of Table 1-A illustrate the following points:

1. The slurries of Tests 2-4 indicate that the Hercules viscosity of H-SAMS can be significantly improved by increasing the amount of fpm mixing shear or by shear from increasing the makedown solids. In either case, greater mechanical work is applied to the H-SAMS which helps to lower slurry dilatancy. However, excessive levels of shear are very detrimental to the structural properties associated with H-SAMS functionality (see property data of Table 1-B). Producing a H-SAMS slurry much above 35% solids is not possible unless pigment structure is reduced to the point of affecting paint performance.

2. The data of Table 1-A indicate that total slurry solids of 50% can be achieved when some Hydragloss 90 clay is used in combination with H-SAMS (compare tests 1 and 5). The minimum level of Hydragloss 90 clay addition required to yield a composite slurry of 50% solids is 20% by weight of total pigment. As the relative amount of Hydragloss 90 employed is further increased from 20% to 55%, slurry solids exceeding 50% can be easily obtained while using only moderate shear conditions (thereby minimizing structure losses). It is important to note that the preparation of our novel pigment slurry (Test number 6) requires only that the H-SAMS portion be first made down at 35.0% solids before adding any Hydragloss 90 clay.

3. Although the use of Hydragloss 90 clay with H-SAMS enables higher slurry solids to be obtained, slurry stability is not directly improved. In fact, the addition of Hydragloss 90 clay appears to accelerate pigment settling versus H-SAMS alone. This feature required that an auxiliary thickener compatible with our H-SAMS/Hydragloss 90 composite system be found (see Example 3 for list of test candidates).

an automated dry bin feed system into the Cowles wet-out tank. Makedown of H-SAMS was continued until

TABLE 1-A

Evaluation of Slurries Produced from H-SAMS and H-SAME/Hydragloss 90

| TEST NUMBER | SLURRIED PIGMENT SYSTEM[1] | SLURRY MAKEDOWN CONDITIONS[2] | MAKEDOWN SOLIDS % | INITIAL VISCOSITIES[4] BF. CPS | HERC. DYNES | SLURRY AGING RESULT |
| --- | --- | --- | --- | --- | --- | --- |
| 1 | H-SAMS | High Shear | 46.0 | 880 | 18+/615 rpm | Jelled at 1 Week |
| 2 | H-SAMS | High Shear | 40.0 | 154 | 10.8 | Soft Sediment at 2 Weeks |
| 3 | H-SAMS | Moderate Shear | 40.0 | 382 | 18+/600 rpm | Jelled at 1 Week |
| 4 | H-SAMS | Moderate Shear | 35.0 | 126 | 18+/425 rpm | Soft Sediment at 1 Week |
| 5 | 80/20 H-SAMS/ HG-90 Composite | High Shear | 50.0 | 172 | 18+/520 rpm | Hard Sediment at 3 Days |
| 6 | 45/55 H-SAMS/ HG-90 Composite[3] | Moderate Shear | 54.0 | 185 | 18+/945 rpm | Hard Sediment at 3 Days |

NOTES
[1] H-SAMS - SAMHIDE 583; HG-90 0 Hydragloss 90: No suspension aides were added.
[2] Cowles-type makedowns: High Shear - tip speed of 4300 fpm, Moderate Shear - tip speed of 2200 fpm.
[3] The novel pigment system of this invention. Slurry was prepared by initial makedown of H-SAMS to 35.% solids followed by addition of hydragloss 90.
[4] Brookfield viscosities measured at 20 rpm; Hercules viscosities determined with A-Bob at 1100 rpm. Viscosities were recorded at stated makedown solids.

TABLE 1-B

The Effects of Mixing Shear on H-SAMS Structure

| TEST NUMBER | H-SAMS MAKEDOWN PARAMETERS | H-SAMS PHYSICAL PROPERTIES Particle Size (sedigraph), % - 2 Microns | Oil Absorption, cc/100 g Pigment |
| --- | --- | --- | --- |
| Spray-Dried H-SAMS Control | — | 61.0 | 140 |
| 1 | High Shear Makedown to 40% Solids | 79.0 | 95 |
| 2 | Moderate Shear Makedown to 35% Solids | 70.5 | 120 |

EXAMPLE 2

In a full scale production trial 14,000 gallons of Polywhite 8004 slurry were prepared using a batch-type Cowles makedown process. In this trial, the H-SAMS and then the Hydragloss 90 clay were made down in succession under moderate shear conditions so as to yield the required 45/55 dry weight ratio at approximately 54.0% total solids. The makedown system consisted of a 700 gallon Cowles wet-out tank used in combination with a 15,000 gallon low shear blending tank. The two tanks were configured so as to provide a recirculation loop from wet-out tank to blend tank and back.

The wet-out tank was equipped with a 100 horsepower Cowles having dual impellers (a standard Cowles blade on the bottom and a marine-type blade above). The tank to blade diameter ratio was 3.3:1 for both impellers and the system was operated at a tip speed of 2200 fpm throughout the makedown process. Baffles were not used in the wet-out tank so as to more quickly incorporate dry pigment through good slurry vortexing action. A high slurry turnover rate of 200+ gpm was also important to obtaining rapid wet-out for the H-SAMS product. This slurry flow rate required us to employ a peristaltic-type pump because of the high dilatancy encountered during H-SAMS makedown. (NOTE: Centrifugal and Moyno pumps are most commonly used in the clay minerals industry.)

The batch process was begun by filling the blending tank with 10,500 gallons of H-SAMS dispersed filter cake slurry whose solids were 22.0%. This filter cake slurry was recirculated through the makedown system whereupon dry H-SAMS were incrementally added via an automated dry bin feed system into the Cowles wet-out tank. Makedown of H-SAMS was continued until slurry solids reached 35.0% (solids were verified by a specific gravity check of 1.26 grams/cc). At this point, dry Hydragloss 90 clay was added in a similar fashion until a 45/55 dry weight ratio of H-SAMS to Hydragloss 90 clay was obtained. This ratio is achieved when total pigment solids reach 54.4% (solids were verified by specific gravity check of 1.49 grams/cc). After adjusting the solids to 54.0% with water, 0.045% Acrysol TT-615 polymer (active basis) was added to improve slurry stability. The polymer emulsion was metered slowly into the slurry vortex of the Cowles wet-out tank to insure homogeneous incorporation. The treated slurry exhibited a Brookfield (20 rpm) viscosity of 1250 cps and a Hercules viscosity (A-Bob at 1100 rpm) of 18+/820 rpm. Finally, this slurry was screened through a 100 mesh Sweco screener prior to shipping No problems with pigment settling or slurry pumpability were noted after the product was transported by tank car over a three week time period. The important physical properties which characterize Polywhite 8004 are summarized in Table 2-A.

Some additional points of interest are discussed below.

1. The viscosity and stability data of Table 2-B clearly illustrate the relationship between Brookfield viscosity and addition level of Acrysol TT-615 and their resulting influence on slurry stability. The slurries having Brookfield viscosities of 1250 and 1400 cps both exhibited good stability pourability characteristics over time while those having Brookfield viscosities significantly below or above that range did not. Typically, active polymer dosages ranging from 0.03-0.07% have yielded optimum Brookfield viscosity. Also noteworthy is the fact that Acrysol TT-615 can adjust Brookfield viscosity while having little to no detrimental effect on Hercules viscosity.

2. The relative order of pigment addition utilized in the makedown process is important. Conceptually, sufficient dry H-SAMS could be added to a Hydragloss 90 slurry of 39-40% solids to yield Polywhite 8004. However, H-SAMS is difficult to wet-out and disperse because of its high structure properties (oil absorption=140-150 cc/100 g). This difficult situation is made worse when trying to make down H-SAMS into existing slurries having pigment solids already in excess of 30% (since less water is available). As a result, required makedown time is significantly increased when H-SAMS follows Hydragloss 90 clay addition.

Table 2-A

Physical Property Specifications for Polywhite 8004 Slurry

| PHYSICAL PROPERTY** | TARGETED RANGE |
|---|---|
| H-SAMS/HG-90 Ratio, by dry weight | 44/56-46/54 |
| Aqueous Slurry Solids, % | 53-55 |
| Weight per Gallon, Lbs. | 12.2-12.5 |
| Wet Sieve Residue, 325 Mesh (max.), % | 0.5 |
| Brightness (dry pigment), Technibrite, % | 91-93 |
| Brookfield Viscosity at 54.0% solids (20 rpm, #2 spindle at 25° C.), cps | 1100-1600* |
| Hercules Viscosity at 54.0% Solids (A-Bob, 1100 rpm AT 25° C.) | 18.0-18+/500 rpm* |
| ph (54.0% Solids) | 10.0-11.0 |
| Particle Size (sedigraph), % - 2 Microns | 73-83 |
| Oil Absorption, "Rub-Out" Method, cc/100 g Pigment | 80-100* |

NOTE:
*These properties are particularly influenced by the shear history during slurry makedown (for example see Table 4-A).
**Reported viscosities are on slurries having our acrylic polymer, Acrysol TT-615, at active % treatment levels of 0.03-0.07%.

agitated storage tank capable of holding up to five tank cars of product.

The wet-out tank was equipped with a 200 horsepower Cowles that was operated at a tip speed of 4300 fpm (3:1 tank to blase diameter ratio and no baffles). The larger mix tank was equipped with a 350 horsepower Cowles that was operated at a tip speed of 5000 fpm (4:1 tank to blade diameter ratio plus baffles). The additional high shear mixing received in this second Cowles tank was very important as it improves product dispersion and lowers Hercules viscosity. Typically, the product throughput rate averages 12 dry tons/hour.

The slurry and spray dried feedstocks utilized in this makedown process were prepared as follows. In a 150,000 gallon storage tank, 105,000 gallons of 22.0% solids H-SAMS dispersed filter cake slurry was blended with 42,200 gallons of 52.2% solids Hydragloss 90 dispersed filter cake slurry to yield a 45/55 dry ratio composite pigment slurry. This filter cake slurry blend represented 246 dry tons of composite pigment at 32.3% solids. The combined amount of organic dispersant (Colloid 211) totaled 0.04% (on active polymer basis). Approximately 60% of our filter cake slurry blend was spray dried using typical commercial drying conditions. The dry composite pigment was then used in combination with filter cake slurry blend to yield the final slurry product.

Combining the dry and slurry feedstocks was accomplished by simultaneously feeding them into the Cowles wet-out tank at rates of 250 pounds/minute and 45 gallons/minute, respectively. The dry composite pigment was metered in by means of an automated dry bin/feeder system. The above feed rates translate to the formation of a 45/55 composite slurry having about 56% solids at a continuous throughput of 12 dry tons/hour (Test Number 1 of Table 3-A). The makedown process was continued until 210 dry tons of slurry prod-

TABLE 2-B

Influence of Brookfield Viscosity on Slurry Stability

| 4555 H-SAMS/HG-90 COMPOSITE SLURRY SLURRY SOLIDS, % | ACRYSOL TT-215 DOSAGE, %** | BROOKFIELD (20 RPM) VISCOSITY, CPS | HERCULES*** VISCOSITY DYNES | SLURRY AGING RESULTS |
|---|---|---|---|---|
| 54.0 | 0 | 175 | 18+/845 rpm | Mostly Hard Sediment at 3 Days |
| 54.0 | 0.22 | 920 | 18+/820 rpm | Some Soft Sediment 2 Weeks |
| 54.0 | 0.045 | 1250 | 18+/820 rpm | No Sediment at 3 Weeks: Good Pourability |
| 54.0 | 0.060 | 1400 | 18+/825 rpm | No Sediment at 3 Weeks: Good Pourability |
| 54.0 | 0.090 | 2340 | 18+/780 rpm | Por Pourability (starting to jell) at 2 Weeks |

Notes:
*Slurry made down in accordance with procedure of Example 2
**Dosage level based on active polymer basis
***Hercules viscosities determined with A-Bob at 1100 rpm.

In a second production trial, the novel composite slurry of this invention was produced using a high shear Cowles, continuous makedown process. In this trial, a spray dried 45/55 composite blend of H-SAMS/Hydragloss 90 was used for building slurry solids directly in a continuous fashion. The makedown system consisted of a 700 gallon Cowles wet-out tank used in sequence with a second Cowles mix tank of 3000 gallon capacity. The composite slurry leaving the second Cowles tank was then pumped, by means of a peristaltic pump, to a large uct had been produced (solids were verified by a specific gravity check to be 55.9%). With all the slurry product now in the large storage tank, solids were reduced to 54.0% with water and the Acrysol TT-615 polymer subsequently added. The polymer was incorporated by means of a tank recirculation line equipped with an injection port/in-line mixer combination. In total, 193.2 active pounds of Acrysol TT-615 polymer was added (0.046% by weight) to yield a Brookfield viscosity of 1230 cps and a Hercules viscosity of 18+/600 rpm (Test Slurry A of Table 3-B). All physical properties were within the specifications outlined in Table 2-A for Polywhite 8004 slurry.

Some additional points of interest are discussed below:

1. It was rather surprising that high shear Cowles dispersion (i.e., tip speeds of 4,000–5,000 fpm) was required in order to yield an equivalent composite slurry product to that produced by the moderate shear batch procedure of Example 2. In particular, the use of Cowles tip speeds less than 4,000 fpm in our continuous process yielded final slurries with unacceptably high Hercules viscosities. These factus clearly emphasize the influence relative pigment addition order has on makedown properties.

2. When using tip speeds of 4,000–5,000 fpm in our continuous process, we found that initial makedown solids approaching 56% were necessary to yield a final product having acceptable rheology at 54% solids. This point is illustrated in Table 3-A. In Test Number 2 (Table 3-A) composite slurry was produced by a similar process scheme as described above except that the dry and slurry feedstocks were metered in at rates of 239 pounds/minute and 48.5 gallons/minute, respectively. This process yielded makedown solids of 54.1% at a continuous throughput of 12 dry tons/hour. As the data show, the resulting Hercules viscosity at 54.0% solids was significantly worse than that in Test Number 1 where initial makedown solids of 55.9% were achieved. It should also be stated that some additional improvements in Hercules viscosity are possible by decreasing the product throughput rate (since retention time in the Cowles tanks is then proportionally increased).

3. In a separate set of laboratory experiments, a small portion of the initial slurry makedown (Test Number 1 of Table 3-A) was used in comparing the relative thickening performance of various suspension aids known in the art versus Acrysol TT-615. The suspension aids that were tested are listed in Table 3-B. All were compared on an active basis addition level of 0.046%. The following conclusions can be drawn from the viscosity data of Table 3-B.

a. Colloid 1560 and Guar Gum C-15 build some Brookfield viscosity, but undesirably do so at the expense of increasing Hercules viscosity. It is interesting, however, to note that Colloid 1560 and Acrysol TT-615 are chemically similar (both are acrylic-based thickeners) yet they perform very differently. This implies some unique synergism between Acrysol TT-615 and our H-SAMS/Hydragloss 90 composite.

b. Van Gel B, a magnesium aluminum silicate product, was completely ineffective in boosting Brookfield viscosity.

c. The Kelgin products (sodium alginates) and Rhodopol 50MD (a xanthan gum) build some Brookfield viscosity but are considerably less effective than Acrysol TT-615.

d. The Cellosize QP-15,000 (a hydroxyethyl cellulose) showed promise as a powerful thickening agent for our composite slurry. However, the major disadvantage associated with its use is that cellulosic thickeners come as dry powders which must be made down at very low solids (typically 2%) in a separate step prior to use. In comparison the Acrysol TT-615, which comes as a 30% solids emulsion in water, can be added directly to our composite slurry under good agitation.

TABLE 3-A

| The influence of Initial Makedown Solids on Final Hercules Viscosity | | | |
|---|---|---|---|
| 45/55 H-SAMS/HG-90 COMPOSITE SLURRY* | | VISCOSITY DATA (BEFORE THICKENER ADDITION) | |
| TEST NUMBER | MAKEDOWN SOLIDS, % | (ADJUSTED) SOLIDS, % | VISCOSITY*** DYNES |
| 1A | 55.9 | 55.9 | 18+/270 rpm |
| 1b | 55.9 | 54.0** | 18+/560 rpm |
| 2 | 54.1 | 54.0** | 18+/370 rpm |

NOTES:
*Slurries were prepared using the continuous makedown process.
**Upon completing makedown solids were reduced to 54.0% solids with dilution water.
***Hercules viscosities were determined with A-Bob at 1100 rpm.

TABLE 3B

| | Comparatice Evaluation of Various Suspending Aides | | | |
|---|---|---|---|---|
| TEST SLURRY | SUSPENDING AIDES | | VISCOSITIES** AT 54.0% SOLIDS | |
| | TRADE NAME/TYPE | ADDITION LEVEL*, % | BROOKFIELD (20 RPM), CPS | HERCULES, DYNES |
| — | NONE | 0 | 175 | 18+/560 rpm |
| A | Acrysol TT-615/Alkali-Soluble Acrylic Polymer | 0.046 | 1230 | 18+/600 rpm |
| B | Colloid 1560/Alkali-Swellable Acrylic Copolymer | 0.046 | 320 | 18+/435 rpm |
| C | Guar Gum C-15/Cationic Guar Derivative | 0.046 | 980 | 18+/350 rpm |
| D | Van Gel B/Magnesium Aluminum Silicate | 0.046 | 45 | 18+/685 rpm |
| E | Kelgin MV/Sodium Alginate | 0.046 | 520 | 18+/640 rpm |
| F | Kelgin HV/Sodium Alginate | 0.046 | 540 | 18+/640 rpm |
| G | Rhodopol 50MD/Xanthan Gum | 0.046 | 500 | 18+/605 rpm |
| H | Cellosize OP-15,000/Hydroxyethyl Cellulose | 0.046 | 3500 | 18+/515 rpm |

NOTES:
*Addition level is based on active chemical basis.
**Hercules viscosities were determined with A-Bob at 1100 rpm.

In this experiment, a 3-horsepower laboratory Cowles dissolver unit was used at an operating tip speed of 4,300 fpm (3:1 tank/blade diameter ratio) to prepare a high solids (60+%) 45/55 composite slurry. The starting materials used in the makedown were a dispersed filter cake blend of H-SAMS/Hydragloss 90 (45/55 dry weight ratio at 32.3% total solids) and the corresponding 45/55 spray dried composite pigment. To 7.0 gallons of the filter cake slurry blend was added 52.3 pounds of spray dried composite pigment over a 20 minute makedown period. The slurry was then mixed an additional 15 minutes whereupon the slurry temperature reached 50° C. Makedown solids were found by a specific gravity check to be 60.7%. The slurry solids were reduced to 54.0% with water and then 15.8 active grams of Acrysol TT-615 (0.046% by weight) were added. The unique physical properties associated with this slurry product are summarized in Table 4-A which also shows comparative data on a typical Polywhite 8004. The data of Table 4-A clearly indicate substantial differences between the two 45/55 composite products. The differences are most likely a consequence of H-SAMS structure reduction from the higher solids conditions under which the Cowles makedown was conducted. Pigment structure changes are important as they have a direct influence on performance in paint systems. In particular, the flat interior latex paint formulation of Table 4-B shows that 85° sheen was increased 24% (which is undesirable) when H-SAMS structure was excessively reduced by the makedown process of this example. In conclusion, this demonstrates that makedown processes as described in Examples 2 and 3 must be practiced if a highly functional pigment system for paint is to be produced.

TABLE 4-A

Select Physical Properties As A Function of Makedown Conditions
45/55 H-SAME/HG-90 COMPOSITE SLURRIES

| PROPERTIES | COMPOSITE SLURRY CONTROL* (SLURRY A, TABLE 3-B) | COMPOSITE SLURRY FROM HIGH-SOLIDS MAKEDOWN |
|---|---|---|
| Viscosities at 54.0% Solids** | | |
| Brookfield (20 rpm), cps | | |
| w/0.046% Acrysol TT-615 | 1230 | 620 |
| w/0.97% Acrysol TT-615 | — | 1240 |
| Hercules (−BOB, 1100 rpm), Dynes | | |
| w/0.046% Acrysol TT-615 | 18+/600 rpm | 5.6 |
| w/0.097% Acrysol TT-615 | — | 7.7 |
| Oil Absorption cc/100 g pigment | 85 | 50 |

NOTE:
*Polywhite 8004 product prepared by a slurry process of this invention
**Acrysol TT-615 polymer added on active chemical basis.

TABLE 4-B

| Paint Formulation and Properties | | |
|---|---|---|
| INTERIOR FLAT-LATEX PAINT FORMULATION | POLYWHITE 8004 CONTROL | COMPOSITE TEST SLURRY |
| "Part A" | | |
| Water | 70.33 | 70.33 |
| Biocide | 1.01 | 1.01 |
| Defoamer | 0.88 | 0.88 |
| KTPP | 1.01 | 1.01 |
| Sodium Nitrite | 2.01 | 2.01 |
| Soya Lecithin | 4.40 | 4.40 |
| Nonionic Surfactant | 1.09 | 1.09 |
| Sodium Polyacrylate Dispersant (25% active) | 3.47 | 3.47 |
| Propylene Glycol | 16.22 | 16.22 |
| TiO$_2$ Slurry (75% active) | 230.46 | 230.46 |
| Diatomaceous Silica | 34.70 | 34.70 |
| Polywhite 8004 Slurry (54% active) | 234.00 | — |
| Composite Test Slurry (54% active) | — | 234.00 |
| Fine Particle-Size Natural Calcium Carbonate Slurry (72% active) | 67.49 | 67.49 |
| DISPERSE AT HIGH SPEED FOR 20 MINUTES | | |
| "Part B" | | |
| Aqueous Ammonia (28% active) | 0.91 | 0.91 |
| Latex (55% active) | 236.30 | 236.30 |
| Water | 187.69 | 187.69 |
| Defoamer | 0.88 | 0.88 |
| Ester-Alcohol (coalescing solvent) | 8.05 | 8.05 |
| Alkali-Swellable Acrylic Thickener (30% active) | 11.81 | 11.81 |
| Biocide | 1.01 | 1.01 |
| TOTAL | 1,113.72 | 1,113.72 |
| PVC, % | 54.10 | 54.10 |
| PAINT PROPERTIES | | |
| Solids, % | 46.7 | 46.7 |
| Consistency, Krebs Units | 102 | 104 |
| Fineness of Grind, Hegman | 1+ | 1+ |
| Directional Reflectance, Y value, % | 92.6 | 92.6 |
| Contrast Ratio | 0.989 | 0.988 |
| Tinted Reflectance, Y value, % | 47.5 | 47.5 |
| Relative Tint Strength, % | 0 | +1.4 |

TABLE 4-B-continued

Paint Formulation and Properties

| | Control | Calcined Clay | Novel Slurry |
|---|---|---|---|
| Sheen. White Substrate. 85° | | 2.5 | 3.1 |
| Gloss. White Substrate. 60° | | 2.7 | 2.8 |
| Scrub Resistance. Abrasive Medium, Cycles | | 140 | 179 |

| Paint Formulation | Control | Calcined Clay | Novel Slurry |
|---|---|---|---|
| Part A | | | |
| Water | 89.70 | 89.70 | 14.88 |
| Methocel (2.3% solids) | 29.80 | 28.90 | 28.90 |
| Tamol 731 (25% solids) | 3.10 | 3.10 | 3.10 |
| Triton X-102 | 1.90 | 1.90 | 1.90 |
| Colloids 60 | 3.10 | 3.10 | 3.10 |
| TKPP (30% solids) | 3.40 | 3.40 | 3.40 |
| PMA-100 | 0.30 | 0.30 | 0.30 |
| Celite 281 | 19.30 | 19.30 | 19.30 |
| Delaminated Clay | 72.40 | 72.40 | — |
| Samhide 583 | 58.30 | — | — |
| Fine Part. Calcined Clay | — | 58.30 | — |
| Novel Pigment Slurry DP-8004 | — | — | 205.00 |
| Disperse at High Speed for 20 minutes | | | |
| Part B* | 547.50 | 547.50 | 547.50 |
| Water | 37.60 | 37.60 | 37.60 |
| Methocel (2.3% solids) | 190.00 | 190.00 | 190.00 |
| Paint Properties: | | | |
| Solids | 41.1 | 41.6 | 41.0 |
| Consistency. Krebs units | 84 | 82 | 85 |
| Fineness of Grind. Hegman | 3.5 | 4.0 | 3.5 |
| Directional Reflectance "Y" Value, White Substrate | 94.6 | 94.8 | 94.8 |
| Contrast Ratio | 0.995 | 0.991 | 0.994 |
| Tinted Reflectance, "Y" Value | 59.0 | 57.6 | 59.2 |
| Relative Tint Strength | (Control) | −8.7 | −1.3 |
| Sheen, White Substrate, 85 degrees | 17.6 | 17.6 | 16.3 |
| Gloss. White Substrate, 60 degrees | 3.5 | 3.6 | 3.8 |
| Scrub Resistance, cycles | 68 | 105 | 75 |

What we claim is:

1. A structured clay pigment slurry consisting of at least 50% solids comprising an approximately 50:50 combination of a fine particle kaolin clay and an alkali metal alumino-silicate having a composition in terms of mole ratio of oxides as follows:

$$xM_2O:Al_2O_3:ySiO_2:zH_2O$$

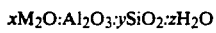

wherein x is the number of moles of alkali metal oxide and is an integer of 0.01 to 2.0, M is an alkali metal, y is the number of moles of $SiO_2$ associated with the compositions and is an integer of 2.0 to 20.0, and z is the number of moles of bound water and is an integer of 1.0 to 5.0, wherein primary particles of said alkali metal alumino-silicate comprise a core of clay platelets having an integral adjacent area of essentially amorphous alkali metal silicate base-kaolin clay reaction product.

2. A structured clay pigment slurry consisting of at least 50% solids comprising an approximately 50:50 combination of a fine particle kaolin clay and an alkali metal alumino-silicate comprising a core of kaolin clay platelets which have been altered at their edges by reaction, so as to be integral with one or more adjacent areas of essentially amorphous alkali metal silicate-base kaolin clay reaction product having a composition in terms of mole ratio of oxides as follows:

$$xM_2O:Al_2O_3:ySiO_2:zH_2O$$

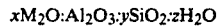

where M is sodium or potassium, x is the number of moles of sodium oxide or potassium oxide and is an integer of 0.01 to 2.0, y is the number of moles of $Sio_2$ in the SAMS composition and is an integer greater than 2.0, and z is the number of moles of bound water and is an integer of 1.0 to 5.0; wherein the primary particles of said alkali metal alumino-silicate have attenuated kaolin peaks as compared to kaolin in x-ray diffraction patterns from the kaolin remnants in the compositions.

3. The slurry of claim 1, wherein the solid content is 54%.

4. The slurry of claim 3, wherein the ratio of alkali metal alumino-silicate to fine kaolin clay is 45 to 55.

5. The slurry of claim 2, wherein the solids content is 54%.

6. The slurry of claim 5, wherein the ration of alkali metal alumino-silicate to fine kaolin clay is 45 to 55.

7. The slurry of claim 1, wherein the fine particle kaolin clay is a delaminated kaolin.

8. The slurry of claim 2, wherein the fine particle kaolin clay is a delaminated kaolin.

* * * * *